(12) United States Patent
Umamageswaran

(10) Patent No.: US 8,051,409 B1
(45) Date of Patent: *Nov. 1, 2011

(54) MONITORING MEMORY ACCESSES FOR MULTIPLE COMPUTER PROCESSES

(75) Inventor: Kothanda Umamageswaran, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 12/543,806

(22) Filed: Aug. 19, 2009

Related U.S. Application Data

(63) Continuation of application No. 10/184,379, filed on Jun. 26, 2002, now Pat. No. 7,669,189.

(51) Int. Cl.
*G06F 9/44* (2006.01)
(52) U.S. Cl. ......................................... 717/127
(58) Field of Classification Search ........... 717/127–131
See application file for complete search history.

(56) References Cited

U.S. PATENT DOCUMENTS

| | | | |
|---|---|---|---|
| 56,200 A | 7/1866 | Li et al. | |
| 135,789 A | 2/1873 | Dewitt, Jr. et al. | |
| 5,367,670 A | 11/1994 | Ward et al. | |
| 6,002,872 A * | 12/1999 | Alexander et al. | 717/127 |
| 6,158,024 A * | 12/2000 | Mandal | 714/37 |
| 6,633,975 B1 * | 10/2003 | Sawada et al. | 713/1 |
| 6,634,020 B1 | 10/2003 | Bates et al. | |
| 6,748,558 B1 | 6/2004 | Gonzales et al. | |
| 7,058,928 B2 | 6/2006 | Wygodny et al. | |
| 7,343,460 B2 | 3/2008 | Poston | |
| 7,409,517 B2 | 8/2008 | Dageville et al. | |
| 7,499,960 B2 | 3/2009 | Dageville et al. | |
| 7,669,189 B1 | 2/2010 | Umamageswaran | |
| 2002/0066079 A1 | 5/2002 | Ionescu | |
| 2003/0056200 A1 * | 3/2003 | Li et al. | 717/128 |
| 2003/0135789 A1 * | 7/2003 | DeWitt et al. | 714/38 |
| 2005/0091373 A1 | 4/2005 | Ciapala et al. | |
| 2005/0114621 A1 | 5/2005 | Lahiri et al. | |
| 2005/0193376 A1 | 9/2005 | Harrison | |
| 2008/0235481 A1 | 9/2008 | Baddepudi et al. | |

OTHER PUBLICATIONS

Carzaniga et. al. "Design and Evaluation of a Wide-area Event Notification Service", Aug. 2001, ACM TOCS vol. 19, Issue 3, pp. 332-383, in parent U.S. Appl. No. 10/184,379.

Begole et al. "Flexible Collaboration Transparency: Supporting Wroker Independence in Replicated Application-sharing Systems", Jun. 1999, ACM, TOCHI vol. 6 Issue 2, pp. 95-132, in parent U.S. Appl. No. 10/184,379.

Bugnion et al. "Disco: Running commodity Operating Systems on Scalable Multiprocessors", Nov. 1997, ACM, TOCS vol. 15, Issue 4, pp. 412-447, in parent U.S. Appl. No. 10/184,379.

U.S. Appl. No. 12/727,803 pp. 27.

* cited by examiner

*Primary Examiner* — Anna Deng

(74) *Attorney, Agent, or Firm* — Silicon Valley Patent Group LLP; Omkar Suryadevara

(57) ABSTRACT

Techniques for monitoring memory accesses for computer programs are provided. A user can instruct a computer program to have one of more of its processes monitor memory accesses to a memory region. As memory accesses to the memory region occur, a log can be created that includes information concerning the memory accesses. The log can be analyzed in order to debug memory access bugs. Additionally, new processes can be spawned that monitor memory accesses in a way that is similar to existing processes.

20 Claims, 7 Drawing Sheets

MONITORING MEMORY ACCESSES FOR MULTIPLE COMPUTER PROCESSES

CROSS-REFERENCE TO RELATED APPLICATIONS

This patent application is a continuation of U.S. patent application Ser. No. 10/184,379, filed Jun. 26, 2002, which is incorporated by reference along with all other references cited in this application.

BACKGROUND OF THE INVENTION

The present invention relates to monitoring memory accesses for computer programs. More specifically, the invention relates to multiple processes of a computer program monitoring memory accesses to a shared memory region.

Debugging is probably the most time intensive part of software development. There are many different types of programming bugs that can be manifested in the computer code. A common bug is a memory access bug, which in general is an access (e.g., read or write) to memory that should not be occurring. A simple example of a memory access bug is as follows. A region of available memory is requested and a pointer to that memory region is obtained. Subsequently, the memory region is freed or released, meaning that the program no longer requires the memory region. If the program latter accesses the memory region through the stale pointer, the results can be unpredictable and crashes can result.

Additional problems can occur if the memory is shared. In general, it is meant by "shared" memory that more than one process (of the same computer program or different computer programs) are able to allocate, utilize, and deallocate memory from the same area. As a result of the memory being shared, a process that writes data to a memory region utilizing a stale pointer can create unacceptable data for a different process that is currently utilizing the memory region. Thus, the other process can exhibit strange behavior or crash.

Debugging these kinds of errors can be extremely frustrating and time consuming. Setting watchpoints for the memory region that is suspect has the drawback that execution of the computer program halts every time the memory region is accessed. Extreme patience may be required if the erroneous memory access occurs after the memory region has been accessed a significant number of times. Often times, the setting of the watchpoint results in the erroneous memory access never occurring as a result of timing.

Typically, there many processes executing concurrently on modern computers. Conventional debuggers allow developers set watchpoints as described above. However, the watchpoints can drastically interrupt the flow of execution of the processes. As a result, the delays that are introduced in order to debug the computer program can result in the bugs never occurring. The timing can also be impacted by the overhead that is required to execute the debugger.

Solutions to this problem have met with limited success. For example, developers can look at the bit patterns of the corrupted memory in order to make an intelligent guess as to the section of computer code that is causing the problem. As can be imagined, this requires a significant amount of time and great knowledge of the computer code. As another example, there are special libraries that can be utilized in order to catch memory access violations. However, not all computer programs can utilize these libraries and the utilization of foreign libraries can generate a new source of errors.

It would be beneficial to have improved techniques for monitoring memory accesses for computer programs. Additionally, it would be beneficial to have innovative techniques for multiple processes to monitor memory accesses to a shared memory region.

BRIEF SUMMARY OF THE INVENTION

The present invention provides innovative techniques for monitoring memory accesses for computer programs. Instead of using a conventional debugger, a computer program can be configured to monitor memory accesses to a memory region that is shared by multiple processes. A user interface can be utilized to direct one or more processes to monitor memory accesses to a memory region. Additionally, a programming interface can be provided that allows monitoring of memory accesses to a memory region whose location is set dynamically at run time. Logs of the memory accesses can also be generated so that the timing of the processes is not unnecessarily impacted. Some specific embodiments of the invention are described below.

In one embodiment, the invention provides a method of monitoring memory accesses for a computer program including multiple processes. The computer program receives input to monitor memory accesses to a memory region that is shared by multiple processes. The processes are directed to monitor memory accesses to the memory region and the processes monitor memory accesses to the memory region.

In another embodiment, the invention provides a method of monitoring memory accesses for a database program including multiple processes. The database program receives input to monitor memory accesses to a memory region shared by the multiple processes. The processes are directed to monitor memory accesses to the memory region and each of the processes monitors memory accesses to the memory region. A new process of the database program is spawned and the new process is also directed to monitor memory accesses to the memory region.

In another embodiment, the invention provides a method of monitoring accesses for a computer program. A function is provided in computer code that when called during run time will cause memory accesses to a memory region to be monitored. Additionally, executing the function during run time to monitor memory accesses to the memory region. A log of memory accesses to the memory region can be written and the log can include any one or more of time stamps of when the memory accesses occurred, process identifiers of a process performing the memory accesses, locations in the code of the computer program that performed the memory accesses, values of the memory, and the like.

In an embodiment, a computer-implemented method of monitoring memory accesses for a computer program including a number of processes, the method includes: receiving input to monitor memory accesses to a memory region that is shared by the processes included in the computer program; directing each of the processes to monitor memory accesses to the memory region; monitoring memory accesses to the memory region using each of processes; and writing to a log of memory accesses to the memory region by the processes, where each entry in the log includes a listing of a stack of functions leading to accessing of the address of the memory region being accessed.

In various embodiments, each of the processes performs the monitoring without using a process external to the computer program. Each entry in the log further comprises an address of the memory region being accessed and a value stored at the address of the memory region being accessed. Each entry in the log further includes an identifier of a process performing accessing of the address of the memory region being accessed. At least one process of the computer program does not monitor memory accesses to the memory region shared by the plurality of processes. The computer program may be a database application.

In various embodiments, the method includes setting a configuration parameter to control a number of functions that will be recorded for each entry of the log in the listing of a stack of functions. The method includes after directing each of the plurality of processes to monitor memory accesses to the memory region, spawning a new process of the computer program, where the new process of the computer program does not monitor memory accesses to the memory region shared by the plurality of processes.

In an embodiment, a computer program product including a number of processes, the computer program product being stored on a computer readable storage medium, including: computer code that generates an interface that receives input to monitor a shared memory region; computer code that directs the processes to monitor the shared memory region; and computer code that causes writing to a log of memory accesses to the memory region by the processes, where each entry in the log includes a listing of a stack of functions leading to accessing of an address of the memory region being accessed. The monitoring of the shared memory region can be without using a process external to the computer program.

In an embodiment, a computer-implemented method of monitoring memory accesses for a database program including a number of processes, the computer-implemented method includes: receiving input that specifies that each of the processes is to monitor memory accesses to a shared memory region; directing each of the processes to monitor memory accesses to the shared memory region; and writing to a log of memory accesses to the memory region by the processes, where each entry in the log includes a listing of a stack of functions leading to accessing of the address of the memory region being accessed.

In various embodiments, the method includes setting an exist configuration parameter to specify monitoring of all processes existing at a time of a command initiating the directing each of the processes, but not processes spawned after the time of the command.

In an embodiment, a computer system includes: a computer program including a number of processes, the computer program being embodied on a computer-readable storage medium; and an interface that receives input to monitor memory accesses to a shared memory region, directs the plurality of processes to monitor memory accesses to the shared memory region, and directs a new process to monitor memory accesses to the shared memory region. The interface allows (i) setting of a first configuration parameter to control a number of functions that will be recorded during monitoring of the shared memory region, (ii) setting of a second configuration parameter to monitor memory accesses by the new process, (iii) setting of a third configuration parameter to specify monitoring of all processes including processes spawned after receiving a command to initiate monitoring memory accesses to the shared memory region, and (iv) setting of a fourth configuration parameter to specify monitoring of all processes existing at a time when receiving the command to initiate monitoring memory accesses to the shared memory region, but not processes spawned after the time of the command. The new process can monitors accesses to the shared memory region without using a process external to the computer program.

In an embodiment, a computer-implemented method of monitoring memory accesses for a computer program, including: providing a function in computer code that when called during run time of the computer program will cause memory accesses to a memory region to be monitored, where the function specifies processes included in the computer program will monitor memory accesses to the memory region, the memory region being shared by the processes; and executing the function during run time of the computer program to monitor memory accesses to the memory region by selected processes, where monitoring memory accesses to the memory region includes writing to a log of memory accesses to the memory region by the selected processes, where each entry in the log includes a listing of a stack of functions leading to accessing of the address of the memory region being accessed.

In various embodiments, accesses to the memory region by a first process access are logged while region is accesses to the memory region by a second process access are not logged. The method further includes allowing setting of a second configuration parameter to specify monitoring of processes existing at a time when receiving a command initiating monitoring of memory accesses of the memory region, but not processes spawned after the time of the command. The method includes allowing setting of a third configuration parameter to specify monitoring of all processes including processes spawned after receiving the command to initiate monitoring of memory accesses to the memory region. The computer program will monitor memory accesses to the memory region without using a process external to the computer program. The computer program can be a database or other application program.

Other objects, features, and advantages of the present invention will become apparent upon consideration of the following detailed description and the accompanying drawings, in which like reference designations represent like features throughout the figures.

DETAILED DESCRIPTION OF THE INVENTION

In the description that follows, the present invention will be described in reference to embodiments that monitor memory accesses to memory regions in computer programs, such as database programs. However, embodiments of the invention are not limited to any particular architecture, environment, application, or implementation. For example, although one embodiment will be described in reference to a database program, the invention may be advantageously applied to any computer program or application. Therefore, the description of the embodiments that follows is for purposes of illustration and not limitation.

Figure 1:
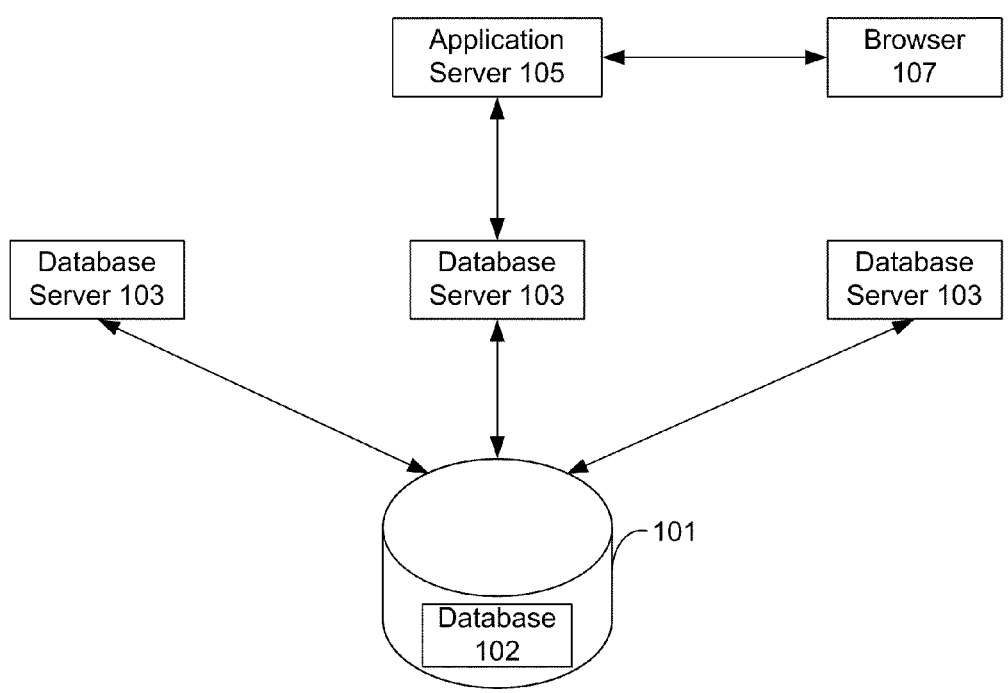
FIG. 1 shows an example of a three-tiered architecture for a database management system.

A fairly common database management system architecture is the three-tiered architecture that is shown in FIG. 1. At the core of the database management system is a central storage 101 that stores a database 102. Database 102 is typically stored on one or more hard drives, which is typically part of a larger computer system. The information can be stored on database 102 in a variety of formats with relational database management systems relying heavily on tables to store the information.

Database servers 103 are instances of a program that interacts with database 102. Each instance of the database server can, among other things, independently query database 102 and store information therein. Database servers 103 may not include user friendly interfaces, such as graphical user interfaces.

Accordingly, one or more application server 105 can provide the user interfaces to database server 103. For example, application server 105 can be a web application server on the Internet (or other network). Application server 105 can provide user friendly mechanisms for accessing database 101 through database server 103. A web browser 107 can be utilized to access application server 105.

Figure 2:
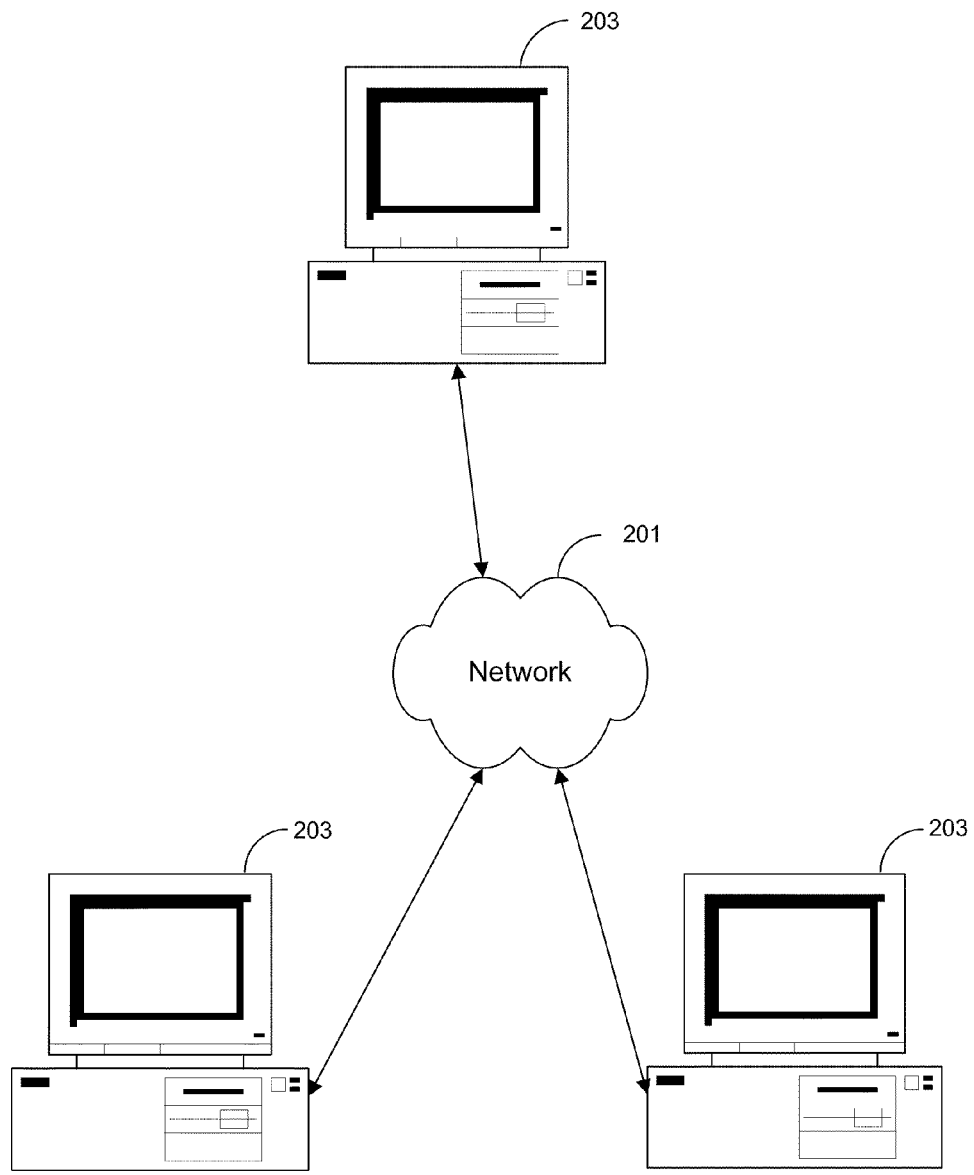
FIG. 2 shows a network providing communication between and among multiple computer systems.

FIG. 2 shows an example of a network that facilitates communication between multiple computer systems. As shown, network 201 allows communication between computer systems 203. Network 201 can be a wide area network (such as the Internet), a local area network or any combination of the two.

Typically, in large database management systems different computer systems are utilized to implement the application servers, database servers and database. However, it is not required that each of these components be implemented on a different computer system. Therefore, the present invention is not to be limited by the description of the database architecture described herein.

Figure 3:
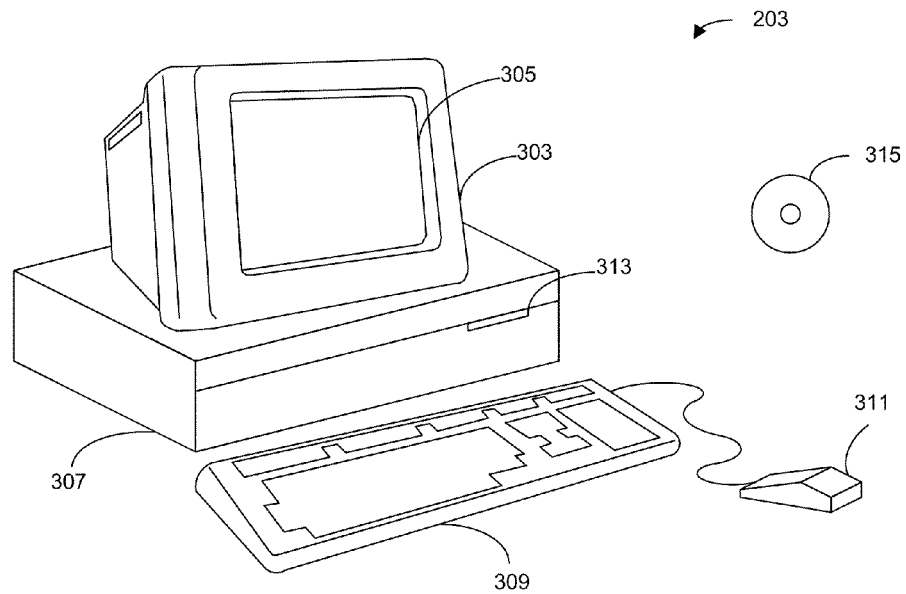
FIG. 3 illustrates an example of a computer system that can be utilized in association with embodiments of the invention.

FIG. 3 illustrates an example of a computer system that can be used in association with embodiments of the invention. FIG. 3 shows computer system 203 that includes a display 303, screen 305, cabinet 307, keyboard 309, and mouse 311. Mouse 311 can have one or more buttons for interacting with a graphical user interface. Cabinet 307 houses a CD-ROM drive 313, system memory and a hard drive (see FIG. 4), which can be utilized to store and retrieve software programs incorporating computer codes that implements the invention, data for use with the invention, and the like. Although CD-ROM 315 is shown as an exemplary computer readable storage medium, other computer readable storage media including floppy disk, tape, flash memory, system memory, and hard drives can be utilized.

Figure 4:
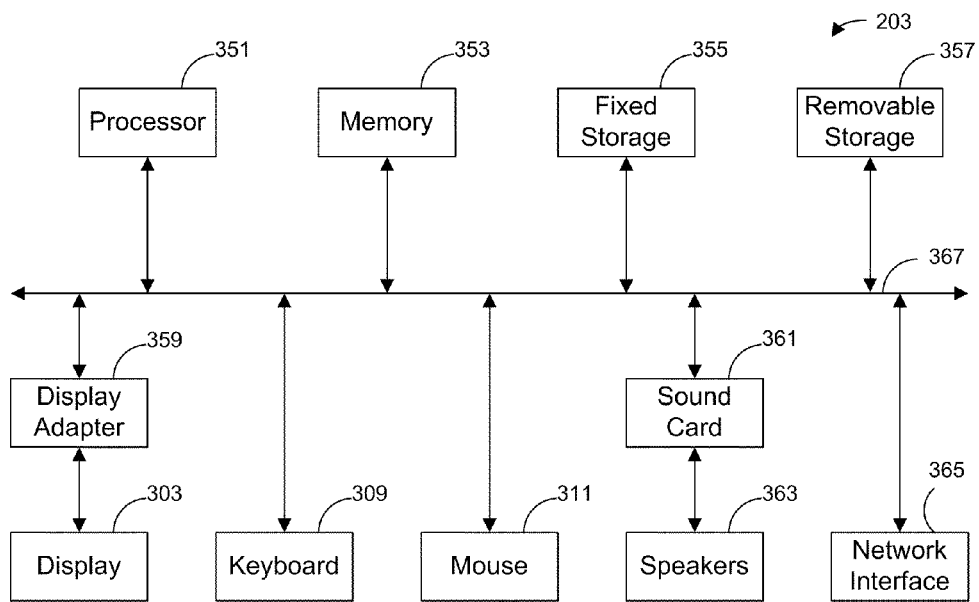
FIG. 4 illustrates a system block diagram of the computer system of FIG. 3.

FIG. 4 shows a system block diagram of computer system 203. As in FIG. 3, computer system 203 includes display 303, keyboard 309, and mouse 311. Computer system 203 further includes subsystems such as a central processor 351, system memory 353, fixed storage 355 (e.g., hard drive), removable storage 357 (e.g., CD-ROM drive), display adapter 359, sound card 361, speakers 363, and network interface 365. Other computer systems suitable for use with the invention can include additional or fewer subsystems. For example, another computer system could include more than one processor 351 (i.e., a multiprocessor system) or a cache memory.

The system bus architecture of computer system 203 is represented by arrows 367. However, these arrows are illustrative of any connection scheme serving to link the subsystems. For example, a local bus could be utilized to connect processor 351 to memory 353 and display adapter 359. Computer system 203 shown in FIG. 4 is but an example of a computer system suitable for use with the invention. Other computer architectures having different configurations of subsystems can also be utilized.

Figure 5:
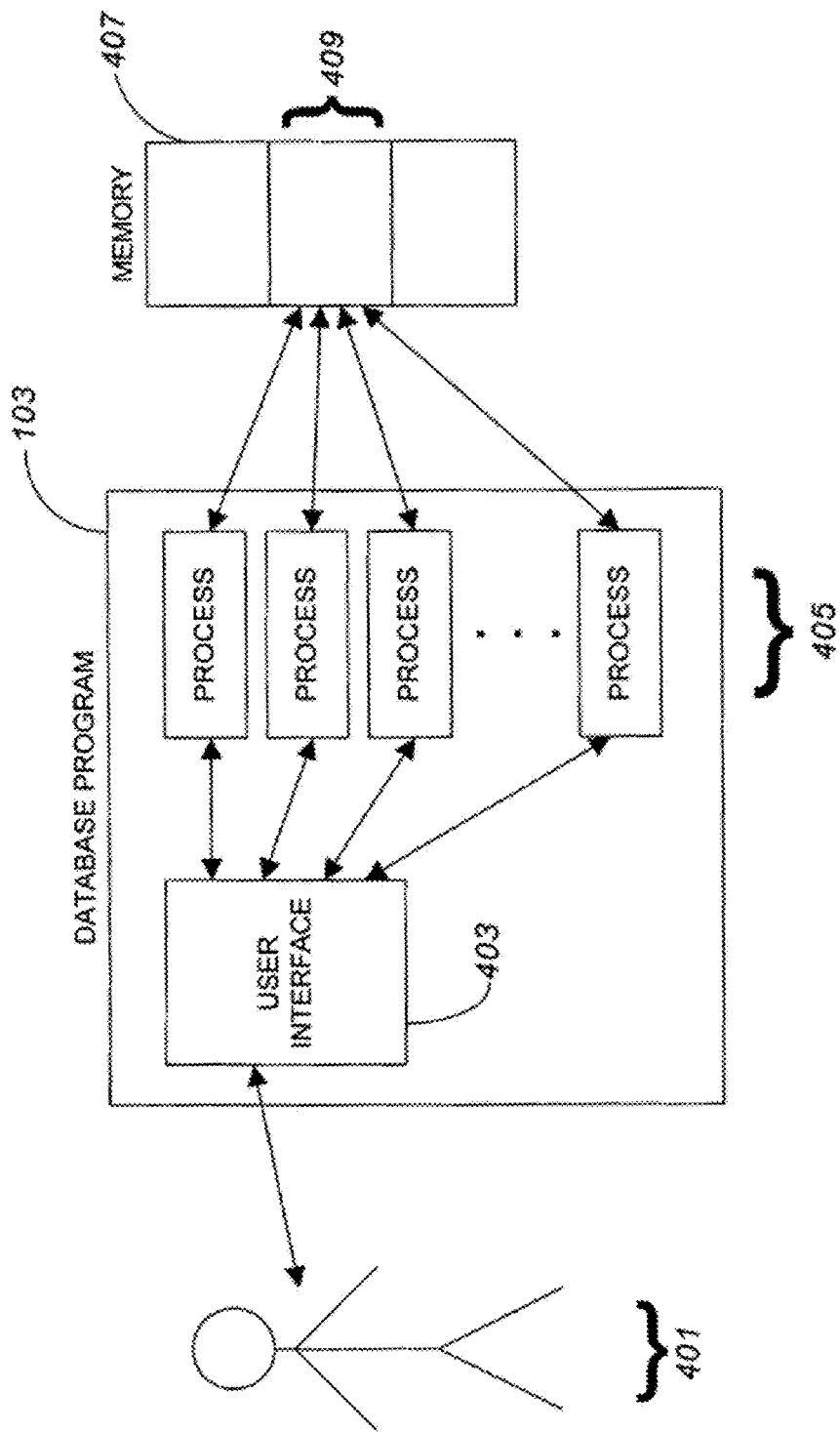
FIG. 5 shows a block diagram of an embodiment of the invention that monitors memory accesses to a memory region that is shared by multiple processes.

FIG. 5 shows a block diagram of an embodiment of the invention that monitors memory accesses to a memory region. A user 401 interacts with database program (or server) 103 through a user interface 403. User interface 403 is utilized to communicate with multiple processes 405. It should be understood that database program 103 can include numerous other components and the components that are shown have been selected in order to illustrate an embodiment of the invention. Other embodiments can include fewer or more components.

Processes 405 access a memory 407. More specifically, processes 405 are all shown to share access to memory region 409. For example, memory region 409 can be a memory region that is shared to communicate and/or coordinate among several processes.

As described above, if a first process 405 is allocated memory region 409, uses it and subsequently frees the memory. Subsequently, a second process 405 can be allocated memory region 409. If the first process 405 accesses memory region 409 through a stale pointer, the behavior of the second process 405 can be unpredictable or crash. In such a scenario, debugging the second process 405 that crashes will not easily identify the problem since it is a different process that is actually corrupting memory region 409.

With one embodiment of the invention, it is not necessary to utilize a conventional debugger. Instead, user 401 can utilize user interface 403 to instruct database program 103 to monitor memory accesses to memory regions, such as memory region 409. User 401 can specify one, some or all of the processes 405 (including later spawned processes) should be directed to monitor memory accesses to memory region 409.

Typically, a user initially identifies the processes that are executing. The user can also identify one or more memory regions in which memory accesses should be monitored.

It may be beneficial to now describe examples of commands user 401 could use to monitor memory accesses. While the computer program is executing, user 401 can enter the following command:

oradebug watch <address> <length> target

This command directs the computer program to monitor memory accesses to the memory region specified by the address and length in the command. The parameter "target" specifies the id of the process in which monitoring of memory accesses to the memory region is desired. It should be understood that the memory region has been specified by an address and length but the memory region can be specified by any number of ways including a starting address and an ending address. Additionally, the memory region may be a memory location.

The above command directed a specific process to monitor memory accesses to a memory region (e.g., create a watchpoint). Instead of specifying the specific target, other parameters can be utilized. For example, the parameter "exist" can be used to specify that all existing processes will be directed to monitor memory accesses to the memory region. The parameter "all" can be utilized to specify that all processes, including those that are spawned (e.g., new) after the command is issued. Also, the parameter "self" can be utilized to monitor memory accesses to the memory region for the debugging process. Should be noted that these commands do not require the user to identify a specific process.

Each watchpoint that is created can be given can be given a unique watchpoint id. For example, the watchpoint id can be displayed after the watchpoint has been created. A watchpoint can be deleted utilizing the following command:

oradebug delete target watchpoint <watchpoint id>

This command would delete a watchpoint that has been created for the process specified by "target." Thus, specific watchpoints can be deleted for specific processes.

A command such as follows can be utilized to delete a watchpoint on all processes:

oradebug delete global watchpoint <watchpoint id>

Additionally, the following command can be utilized to delete a watchpoint that was created for the debugger process:

oradebug delete local watchpoint <watchpoint id>

The proceeding has been provided to give illustrations of commands that can be used in one embodiment to create and delete watchpoints. Different and additional commands in other embodiments so the invention is not limited to the specific embodiments described herein.

The above has described some examples of how watchpoints can be created, it may also be beneficial to have commands that allow a user to view the existing watchpoints. For example, the following command can be utilized to show watchpoints for a specific process:

oradebug show target watchpoints

The watchpoints that have been created for all processes can be viewed utilizing the following command:

oradebug show global watchpoints

Also, the watchpoints that are currently set for the debugger process can be viewed utilizing the following command:

oradebug show local watchpoints

The user interface that is being described is a text-based interface but these techniques can advantageously be applied to a graphical user interface.

Watchpoints can operate like traditional debugger breakpoints and halt the execution of the computer program when the memory region of interest is accessed. However, watchpoints of embodiments of the invention can also be utilized to monitor memory accesses to memory regions and writing a log concerning the memory accesses without halting execution. The generation of a log can be very efficient in terms of computation time so that the computer program need not have the timing of the interaction of the processes disturbed. Of course, in some embodiments, watchpoints can be utilized to halt the execution of the computer program and also generate a log of memory accesses.

Figures 6, 7:
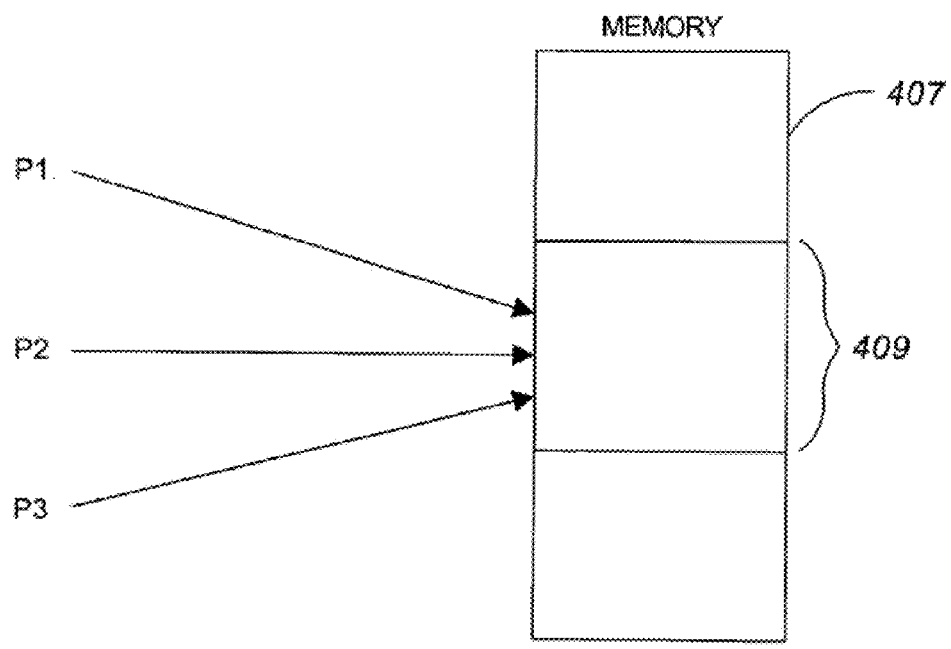
FIG. 6 shows an example of three processes that are accessing a memory region.
FIG. 7 shows an example of a log that can be generated to monitor memory accesses to the memory region shown in FIG. 6 by the three processes.

In order to show an example of a log of memory accesses, FIG. 6 shows memory 407 that has memory region 409, which is being accessed by three processes that have been labeled P1, P2 and P3. Thus, these three processes share memory region 409 and can legally perform memory accesses to the memory region if it is allocated to them.

Assume that the user has instructed the computer program to monitor memory accesses to memory region 409 for all existing processes, including processes P1, P2, and P3. As the computer program executes, a log can be written that shows the memory accesses that processes P1, P2, and P3 have performed on memory region 409 in chronological order.

FIG. 7 shows an example of a section of the log that could be written and analyzed in order to identify memory access violations to memory region 409. As shown, the log includes a time stamp of when the memory access occurred, a process identifier of the process performing the memory access, a location in the code of the computer program that performed the memory access, and a value of the memory. At time T1 process P2 performed a memory access to memory region 409. Location L1 specifies a location in the code of the computer program that performed the memory access. In looking at the code, location L1 indicates that process P2 freed or released memory region 409. Thus, process P2 should not access memory region 409 unless it requests memory and is subsequently given access to this memory region.

Assume at time T2, process P3 requests memory and is given access (e.g., a pointer to) memory region 409. The allocation of memory can be determined by analyzing the code of the computer program that is specified by location L3.

At time T3, process P2 performs a memory write to memory region 409 with the value of Z. The memory write operation can be determined by the code of the computer program at location L15. This simple example illustrates that the log can be utilized to determine that process P2 has utilized a stale pointer to perform an illegal memory access to memory region 409. The specific entries in the log can be varied in different applications so the invention is not limited to any specific entries in the log. The following will also describe other entries in the log that may be beneficial.

The locations in the code of the computer program can be instruction addresses or offsets in a function. Additionally, the computer program can also analyze the memory access that is specified in the code of the computer program and indicate the type of memory access that is being performed. In another embodiment, the location in the code of the computer program is a stack of functions, where the stack of functions indicates the call sequence of the functions that led to the memory access. For example, the following table shows a log of memory accesses to a memory region or location similar to FIG. 7.

| ADDRESS | VALUE | FILE/PROCESS | STACK |
|---|---|---|---|
| 0x800066F0 | 00000002 | ade14_ora_3203.trc | ksmpoke( ) +340<br>ksdxfpok ( )+256<br>ksdxen ( ) +2572<br>opiodr ( ) +5736 |
| 0x800066F0 | 00000004 | ade14_ora_3247.trc | ksmpoke ( )+340<br>ksdxfpok( )+256<br>ksdxen( ) +2572<br>opiodr ( ) +5736 |
| 0x800066F0 | 00000006 | ade14_ora_3253.trc | ksmpoke ( ) +340<br>ksdxfpok ( ) +256<br>ksdxen ( ) +2572<br>opiodr ( ) +5736 |

As can be seen above, the portion of the log shown above shows that three different processes accessed the memory region of interest in the time order shown. The log shows the value of the memory region or location and additionally, the log shows a stack of the functions that led to the memory access. Each function is identified by the function name and offset into the function that either called a subsequent function or performed the memory access of interest. The presentation of the stack of functions allows the user to not only identify the memory access, but also the flow of execution that led to the memory access in question. In one embodiment, the number of functions that will be displayed in the stack entry of the log can be controlled by configuration parameters.

The commands described above that direct a computer program to monitor memory accesses to a memory region or described as being input to the computer program as it is executing. In other embodiments, one or more functions in computer code can be provided that when called during run time will cause memory accesses to a memory region to be monitored. For example, a source code function can be provided as follows to create a watchpoint for a memory region:

id=createwatchpoint(p, sizeof(mystruct), modeall);

Thus, a source code function to create a watchpoint is generated that can be compiled and linked into the computer program. The source code function that creates the watchpoint is then inserted into the source code of the computer program at the location of interest.

A corresponding function can be utilized to delete a watchpoint as follows:

delete watchpoint(id, p, sizeof(mystruct), modeall);

As can be seen, the id of the watchpoint is utilized as a parameter and a mode parameter indicates that the watchpoint should be created for all processes. A modeself parameter can also be used to create a watchpoint for the existing process. Other mode parameters can be utilized, including those described above in reference to the user commands.

Although inserting a function into a computer program for monitoring accesses to memory regions may be slightly more cumbersome than user commands during execution, one advantage is that memory accesses to memory regions whose location is only known at run time (e.g., dynamic) can be accomplished without halting execution of the computer program as in traditional debuggers. The function can be provided in source code, assembly code, object code or any other format. The function is executed during run time to monitor memory accesses to the memory region. The operation of the watchpoint during execution of the computer program can be implemented as described above.

Figure 8:
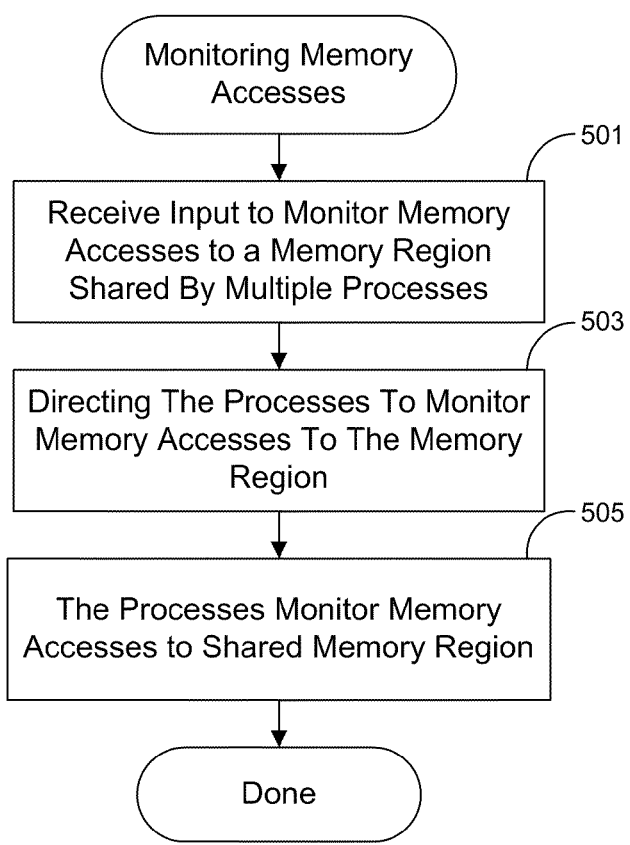
FIG. 8 shows a flowchart of a process of monitoring memory accesses to a memory region in one embodiment of the invention.

FIG. 8 shows a flowchart of a process of monitoring memory accesses to a memory region in one embodiment of the invention. As with all the flowcharts described herein, steps can be added, deleted, combined, and reordered without departing the spirit and scope of the invention.

At a step 501, input to monitor memory accesses to a memory region shared by multiple processes is received. Thus, the computer program receives input that memory accesses to the memory region are to be monitored.

The processes are directed to monitor memory accesses to the memory region at a step 503. In one embodiment, a process is directed by storing the memory monitoring information in a known shared memory region and sending the process a signal. When the process receives the signal, the process examines the known shared memory region to retrieve the memory monitoring information and sends an acknowledgement back that they were received.

In another embodiment, the processes can periodically check a known shared memory region for memory monitoring information. This can have an advantage that processes are not interrupted, but a disadvantage that too much time may pass before a process receives the information. Therefore, in another embodiment, a signal is sent to the process if an acknowledgement is not received that the memory monitoring information was received in a specific amount of time.

At a step 505, the processes monitor memory accesses to the memory region. The memory accesses are typically monitored by writing a log of data relating to the memory access, which can be analyzed by a user at a later time. Alternatively, or in combination, memory accesses can be monitored by halting execution (e.g., like breakpoints) or by invoking a conventional debugger.

Figure 9:
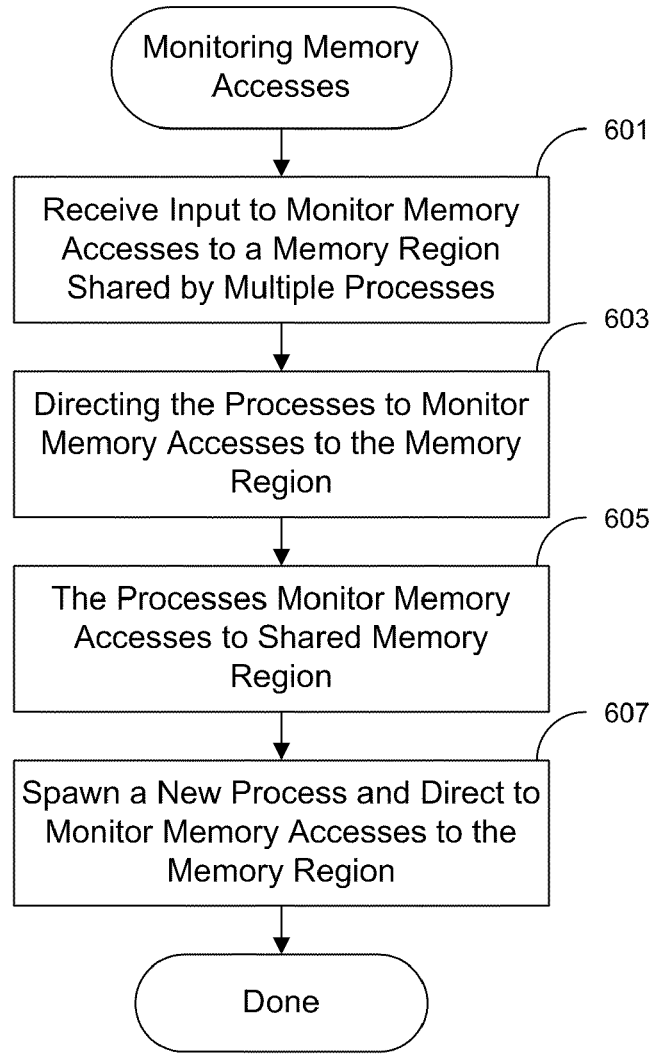
FIG. 9 shows a flowchart of a process of monitoring memory accesses to a memory region according to another embodiment of the invention.

FIG. 9 shows a flowchart of a process of monitoring memory accesses to a memory region in another embodiment of the invention. At a step 601, input is received to monitor memory accesses a memory region shared by multiple processes. In a specific embodiment, the computer program is a database program that includes multiple processes.

The processes are directed to monitor memory accesses to the memory region at a step 603. At a step 605, the processes monitor memory accesses to the memory region. At a step 607, a new process is spawned and directed to monitor memory accesses to the memory region. In this manner, the new process effectively inherits the watchpoint from the other processes. As described before, the commands can specify whether or not new processes should monitor memory accesses to the memory region like existing processes.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A computer-implemented method of monitoring memory accesses by a computer program including a plurality of processes, the method comprising:
   receiving input to create a watchpoint to monitor memory accesses to a memory region that is shared by the plurality of processes included in the computer program, wherein the watchpoint is given a unique identifier;
   displaying the unique identifier to identify said watchpoint;
   directing each of the plurality of processes to monitor memory accesses to the memory region;
   monitoring memory accesses to the memory region by each of the plurality of processes utilizing the watchpoint; and
   writing to a log of memory accesses to the memory region by the plurality of processes, wherein each entry in the log comprises a listing of a stack of functions leading to accessing of an address of the memory region being accessed and wherein at least one entry in the log identifies an illegal memory access by one of the processes writing data to the shared memory region by utilizing a stale pointer after release of the shared memory region.

2. The method of claim 1 wherein each of the plurality of processes performs the monitoring without using a process external to the computer program.

3. The method of claim 1 wherein each entry in the log further comprises an address of the memory region being accessed and a value stored at the address of the memory region being accessed.

4. The method of claim 1 wherein each entry in the log further comprises an identifier of a process performing accessing of the address.

5. The method of claim 1 further comprising:
   setting a configuration parameter to control a number of functions that will be recorded for each entry of the log.

6. The method of claim 1 further comprising after directing each of the plurality of processes to monitor memory accesses to the memory region, spawning a new process of the computer program, wherein the new process of the computer program does not monitor memory accesses to the memory region shared by the plurality of processes.

7. The method of claim 1 wherein at least one process of the computer program does not monitor memory accesses to the memory region shared by the plurality of processes.

8. The method of claim 1 wherein the computer program is a database application and the method further comprises:
receiving additional input comprising said unique identifier to delete said watchpoint.

9. A non-transitory computer readable storage medium comprising:
computer code that when executed generates an interface that receives input to create a watchpoint to monitor a shared memory region, wherein the watchpoint is given an identifier;
computer code that when executed displays the identifier of said watchpoint;
computer code that when executed directs each of the multiple processes to monitor memory accesses to the shared memory region;
computer code that when executed monitoring memory accesses to the memory region by each of the multiple processes utilizing the watchpoint; and
computer code that when executed writes to a log of memory accesses to the memory region by the multiple processes, wherein each entry in the log comprises a listing of a stack of functions leading to accessing of an address of the shared memory region being accessed and wherein at least one entry in the log identifies an illegal memory access by one of the processes writing data to the shared memory region by utilizing a stale pointer after release of the shared memory region.

10. The non-transitory computer readable storage medium of claim 9 further comprising:
computer code that when executed monitors the shared memory region without using a process external to the computer program.

11. A system comprising at least one processor to monitor reading and writing by a database program including a plurality of processes, the system comprising:
the database program comprising a first function to be called during run time to create a watchpoint that specifies that each of the plurality of processes is to monitor memory accesses to a shared memory region;
the first function returning an identifier of said watchpoint;
the database program further comprising a second function to delete said watchpoint, wherein said identifier is a parameter of said second function;
a server of a relational database management system executing the first function during run time to monitor memory accesses to the shared memory region by the database program utilizing the watchpoint; and
the server writing to a log of memory accesses to the shared memory region by the plurality of processes, wherein each entry in the log comprises a listing of a stack of functions leading to accessing of an address of the shared memory region being accessed and wherein at least one entry in the log identifies an illegal memory access by one of the processes writing data to the shared memory region by utilizing a stale pointer after release of the shared memory region.

12. The system of claim 11 wherein:
a parameter of said first function specifies monitoring of all processes existing at a time of execution of said first function, but not processes spawned after said time.

13. A computer system comprising:
a computer program that when executed creates a plurality of processes, the computer program being embodied on a non-transitory computer-readable storage medium; and
an interface that receives input to create a watchpoint to monitor memory accesses to a shared memory region;

wherein:
the watchpoint is given an identifier;
the computer program directs the plurality of processes to monitor memory accesses to the shared memory region, displays the identifier of said watchpoint, and directs a new process to monitor memory accesses to the shared memory region,
wherein the interface further receives input on at least one of:
setting of a first configuration parameter to control a number of functions to be recorded during monitoring of the shared memory region,
setting of a second configuration parameter to monitor memory accesses by the new process utilizing the watchpoint,
setting of a third configuration parameter to specify monitoring of all processes including processes spawned after receiving a command to initiate monitoring memory accesses to the shared memory region, and
setting of a fourth configuration parameter to specify monitoring of all processes existing at a time when receiving the command to initiate monitoring memory accesses to the shared memory region, but not processes spawned after the time of the command;
the computer program further comprising instructions to write a log of memory accesses to the shared memory region by the plurality of processes, wherein each entry in the log comprises a stack of functions leading to accessing of an address of the shared memory region being accessed and wherein at least one entry in the log identifies an illegal memory access by one of the processes writing data to the shared memory region by utilizing a stale pointer after release of the shared memory region.

14. The computer system of claim 13 wherein the new process monitors accesses to the shared memory region without using a process external to the computer program.

15. A computer-implemented method of monitoring memory accesses by a computer program, comprising:
providing a function in computer code that when called during run time of the computer program will create a watchpoint to cause memory accesses to a memory region to be monitored, wherein the watchpoint is given an identifier and wherein the function specifies that processes included in the computer program will monitor memory accesses to the memory region, the memory region being shared by the processes; and
executing the function during run time of the computer program to display a said identifier of said watchpoint and monitor memory accesses to the memory region by selected processes utilizing the watchpoint,
wherein the memory accesses comprise an illegal memory access to write data to the shared memory region, by a process utilizing a stale pointer after release of the shared memory region,
wherein monitoring memory accesses to the memory region comprises writing to a log of memory accesses to the memory region by the selected processes, wherein each entry in the log comprises a listing of a stack of functions leading to accessing of an address of the memory region being accessed and at least one entry in the log identifies said illegal memory access.

16. The method of claim 15 wherein accesses to the memory region by said process access are logged while accesses to the memory region by another process are not logged.

17. The method of claim 15 further comprising:

receiving input on a second configuration parameter to specify monitoring of processes existing at a time when receiving a command initiating monitoring of memory accesses of the memory region, but not processes spawned after the time of the command.

18. The method of claim 17 further comprising:

receiving additional input on a third configuration parameter to specify monitoring of all processes including processes spawned after receiving the command to initiate monitoring of memory accesses to the memory region.

19. The method of claim 15 wherein the computer program comprises code to monitor memory accesses to the memory region without using another process external to the computer program.

20. The method of claim 15 wherein the computer program is a database program.

* * * * *

UNITED STATES PATENT AND TRADEMARK OFFICE
CERTIFICATE OF CORRECTION

| | | |
|---|---|---|
| PATENT NO. | : 8,051,409 B1 | |
| APPLICATION NO. | : 12/543806 | |
| DATED | : November 1, 2011 | |
| INVENTOR(S) | : Umamageswaran | |

It is certified that error appears in the above-identified patent and that said Letters Patent is hereby corrected as shown below:

On the Title Page, Item (56) under "Other Publications", line 5, delete "Wroker" and insert -- Worker --, therefor.

Signed and Sealed this
Thirty-first Day of January, 2012

David J. Kappos
*Director of the United States Patent and Trademark Office*